United States Patent Office 2,857,356
Patented Oct. 21, 1958

2,857,356

ORGANOPOLYSILOXANE COMPOSITIONS HAVING PRESSURE-SENSITIVE ADHESIVE PROPERTIES

John T. Goodwin, Jr., Kansas City, Mo., assignor to General Electric Company, a corporation of New York No Drawing. Application July 8, 1954
Serial No. 442,181

15 Claims. (Cl. 260—42)

This invention is concerned with novel organopolysiloxane compositions having pressure-sensitive adhesive characteristics. More particularly, the invention is concerned with organopolysiloxanes eminently useful in the pressure-sensitive adhesive field, said compositions comprising the product of reaction of a mixture of ingredients comprising (a) a hydroxy-containing cohydrolysis product of a trialkyl hydrolyzable silane and an alkyl silicate and (b) a linear, fluid, high viscosity organopolysiloxane containing terminal silicon-bonded hydroxy groups. The invention is also directed to pressure-sensitive tapes, sheets, etc., of good tack and cohesive strength comprising a backing to which the aforementioned pressure-sensitive adhesive is applied.

Pressure-sensitive adhesives have been used in the past for various purposes including sealing purposes, for joining abutting edges, fastening purposes, masking, insulating, etc. These pressure-sensitive adhesives heretofore known have been adapted for use generally at around normal temperatures. Their utility at extremely high temperatures, such as 200° to 250° C. or higher, for long periods of time or for use at low temperatures of about −75° to −100° C., has been unsatisfactory for the reason that at the elevated temperatures, the adhesive tended to flow undesirably so that its adhesive properties were lost or else the adhesive decomposed undesirably to a point where again the adhesive properties became non-existent. At temperatures well below normal temperatures, the adhesive tended to crystallize and lose its adhesive characteristics so that it was practically useless at such temperatures. Because of the above-mentioned temperature restrictions, the uses of pressure-sensitive adhesives in many applications have been undesirably limited.

Another adhesion problem for which a solution has been sought for a long time involves adhering polymeric materials, for instance, tapes made from polytetrafluoroethylene, organopolysiloxane rubbers and resins, polychlorotrifluoroethylene, etc., to various surfaces, for instance, in insulating applications where, if these particular polymers could be satisfactorily wound and adhered to metallic conductors, good advantage could be taken of the insulating characteristics of these particular polymers. Unfortunately, adhesives for these polymers have heretofore either been non-existent or unsatisfactory and, therefore, pressure-sensitive adhesive tapes prepared from such polymeric materials have not been found to be commercially feasible up to the present time.

A further limiting factor in the use of pressure-sensitive adhesives heretofore known has been the susceptibility of these adhesives to moisture whereby in high humidity conditions the adhesive characteristics have been undesirably diminished.

It is, therefore, one of the objects of this invention to prepare a pressure-sensitive adhesive which has utility over a wide temperature range, retaining desirable degrees of tack and cohesion over such temperature ranges.

Another object of the invention is to prepare a pressure-sensitive adhesive which exhibits a low level of moisture sensitivity.

A still further object of the invention is to obtain a pressure-sensitive adhesive for polymeric materials for which previously known pressure-sensitive adhesives have exhibited little or no affinity.

A further object of the invention is directed to a pressure-sensitive adhesive which can operate at both high and low temperatures and can show strong adhesion and affinity for surfaces maintained at both high and low temperatures to a high degree.

Other objects of this invention will become apparent from the description which follows.

All the foregoing objects described above of a pressure-sensitive adhesive having the above desirable properties of good tack and cohesive strength over a wide range of temperature can be attained and the difficulties mentioned previously obviated by preparing a pressure-sensitive adhesive using a critical mixture of ingredients in critical proportions and ranges. More particularly, such an adhesive may be obtained by intercondensing a mixture of ingredients comprising (1) a cohydrolysis product of a trialkyl hydrolyzable silane and alkyl silicate (either in the monomeric or polymeric state), said cohydrolysis product containing a plurality of silicon-bonded hydroxy groups, and (2) a linear, high viscosity organopolysiloxane fluid containing terminal silicon-bonded hydroxy groups.

The trialkyl hydrolyzable silane used in the preparation of the resin is one which corresponds to the general formula $$R_3SiX$$

where R is a lower alkyl radical (e. g., methyl, ethyl, propyl, isopropyl, butyl, isobutyl, etc.), and X is a hydrolyzable group, for instance, halogen (e. g., chlorine, bromine, fluorine, etc.), alkoxy radical (e. g., methoxy, ethoxy, etc.), acyloxy, etc. It is essential that R be a lower alkyl radical since higher alkyl radicals undesirably slow down the hydrolysis of the $R_3SiX$ compound and cause a different type of intercondensation with the alkyl silicate, thus leading to less desirable products. Obviously, R may be the same or different lower alkyl radicals.

The alkyl silicate employed for cohydrolysis with the trialkyl hydrolyzable silane is one which corresponds to the general formula $$(RO)_4Si$$

or a polyalkyl liquid silicate obtained by hydrolyzing the monomeric silicate to a stage where it is still liquid and preferably has a viscosity (for ease of handling) below about $0.5 \times 10^6$ centipoises. R in the above formula may be the same as that described for the trialkyl hydrolyzable silane and again obviously may be the same or different lower alkyl radicals disposed around the silicon atom.

Hydrolysis of the monomeric silicates to form the polymeric alkyl silicates containing a plurality of silicon-bonded hydroxy groups may be effected by incorporating in the monomeric silicate (for instance, monomeric ethyl orthosilicate) acidic materials which will effect hydrolysis, for instance, hydrochloric acid, sulfuric acid, phosphoric acid, etc. The incorporation of acid-forming metallic salts, for instance, ferric chloride, aluminum chloride, etc., may also be used for similar purposes. When employing the polymeric liquid alkyl polysilicate (for instance, polyethyl silicate), the hydrolysis is effected in such a manner that in addition to their being present silicon-bonded alkoxy radicals (where the alkyl group is a lower alkyl radical), there will also be present a plurality of silicon-bonded hydroxyl groups. These silicon-bonded hydroxyl groups are required for interaction with the trialkyl hydrolyzable silane in the hydrolysis medium and for further reaction with the organopolysiloxane fluid in forming the pressure-sensitive adhesive. The availability of silicon-bonded hydroxyl groups when working with a monomeric alkyl silicate is effected in the hydrolysis medium of the trialkyl hydrolyzable silane whereby the hydrogen halide acid liberated as a result of hydrolyzing a hydrolyzable silane containing a silicon-bonded halide, e. g., chlorine as the hydrolyzable group, and hydrogen chloride as the hydrohalide, will also effect condensation of the monomeric alkyl silicate to the desired hydroxy-containing polyalkyl silicate in one operation without requiring a preformed polyalkyl silicate. When cohydrolyzing an alkoxysilane with a monomeric alkyl silicate, it is necessary to add a small amount of an acid such as HCl, to effect hydrolysis and intercondensation.

The cohydrolysis of the trialkyl hydrolyzable silane and the alkyl silicate (this designation for the silicate is intended hereinafter to include both the monomeric and polymeric forms of the alkyl silicate) is relatively simple and merely requires addition of the trialkyl hydrolyzable silane and the alkyl silicate to a suitable solvent, such as toluene, benzene, xylene, etc., and thereafter addition of the solution of the ingredients to a sufficient amount of water to effect the desired hydrolysis and co-condensation in a suitably acidic medium. The choice of the solvent will depend on such considerations as, for instance, the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not effect adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of co-hydrolyzate, that is, the trialkyl hydrolyzable silane and the alkyl silicate.

The amount of water used for hydrolysis purposes is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water will generally be determined by the ease with which the co-hydrolyzate can be processed to isolate the co-hydrolysis product or resin (the term "resin" will hereinafter be intended to refer to the co-hydrolyzate of the trialkyl hydrolyzable silane and the alkyl silicate whether in polymeric or monomeric form). If too much water is employed, the amount of acid present (either the hydrogen halide resulting when using trialkyl halogenosilanes or the acid, such as hydrochloric acid or sulfuric acid which must be added to effect co-hydrolysis of non-acid-producing trialkyl hydrolyzable silanes, such as trialkyl alkoxysilanes) will be diluted to a point that the degree of condensation will be undesirably lowered and the de-alkoxylation of the alkyl silicate which is essential in the preparation of the resin will be undesirably reduced so that the necessary minimum level of silanol groups in the resin will not be obtained. Conversely, if one uses too little water for hydrolysis purposes, the concentration of the alkanol resulting from the co-hydrolysis reaction will be raised to such a high point that there will be insufficient phase separation, again making it difficult to separate the resin from the hydrolysis medium and undesirably reducing the yield of resin because of unavoidable losses resulting in increased solubility of the resin in the alcohol phase, making it difficult and impractical to attempt to recover this alcohol-soluble resin portion. The amount of water used should be at least from 2 to 3 mols water per total molar concentration of the trialkyl hydrolyzable silane and the alkyl silicate. In general, the amount of water used should be as low as possible to assist in good yields of the resin while utilizing to the fullest extent the space available in equipment used for hydrolysis purposes. An upper range of water which may be used with satisfactory results is that of the order of about 40 to 50 mols per mol of mixture of trialkyl hydrolyzable silane and alkyl silicate.

For optimum properties in the pressure-sensitive adhesive, that is, for good tackiness and cohesive strength, I have found that for each mol of the trialkyl hydrolyzable silane, I should use from 1 to 2 mols of the alkyl silicate, advantageously within the range of about 1.2 to 1.8 mols of the alkyl silicate per mol of trialkyl hydrolyzable silane. In the preparation of the resin, one may add small amounts, for instance, up to 5 per cent, by weight, based on the weight of the trialkyl hydrolyzable silane of other cohydrolyzable materials, such as dimethyldichlorosilanes, methyltrichlorosilane, etc. However, satisfactory properties in the pressure-sensitive adhesive are realized without these additional ingredients and preferably for control purposes these small amounts of added hydrolyzable organosilanes are omitted.

In preparing the resin, the trialkyl hydrolyzable silane and alkyl silicate are dissolved in a suitable solvent, and added with stirring to the water of hydrolysis, advantageously using temperatures of from 60 to 85° C. Thereafter, the two-phase system thus obtained is processed to remove the water-alcohol layer and the remaining resinous material is neutralized with a sufficient amount of sodium bicarbonate or other alkaline material to give a pH of at least about 6 or 7. Thereafter, the resin is filtered and advantageously adjusted to a resinous solids content of about 30 to 65 percent, using, where necessary, additional amounts of solvents such as toluene, xylene, etc., in order to avoid premature gelation of the resin and to maintain its stability for a time sufficient to permit its use with the fluid. This solids content adjustment is usually only required where improper proportions of reactants and solvent are originally used.

The linear, high viscosity organopolysiloxane fluid containing terminal silicon-bonded hydroxyl groups used for co-reacting with the above-described trialkyl hydrolyzable silane and alkyl silicate must, of necessity, have end groups composed of silicon-bonded hydroxyl groups to permit ready copolymerization with the resin. For this purpose, I have found that starting materials corresponding to the general formula $$(R'R''SiO)_n$$

are most suitable for making the fluid, where R' and R'' are organic radicals selected from the class consisting of alkyl radicals (e. g., lower alkyl radicals, many examples of which have been given above, hexyl, decyl, etc.), aryl radicals (e. g., phenyl, diphenyl, naphthyl, etc.), alkaryl radicals (e. g., tolyl, xylyl, ethylphenyl, etc.), aralkyl radicals (e. g., benzyl, phenylethyl, etc.), haloaryl radicals (e. g., chlorophenyl, tetrachlorophenyl, difluorophenyl, etc.), alkenyl radicals (e. g., vinyl, allyl, etc.) which should be present in amounts less than 5 to 10 percent of the total number of organic radicals in the starting materials, and where $n$ is an integer equal to at least 3, e. g., from about 3 to 10 or more, depending upon the organic group in the starting organopolysiloxanes.

The above-described starting cyclic organopolysiloxanes are eminently suitable for preparing the high viscosity fluids used in the practice of the present invention because of the ability to obtain readily terminal silanol groups on condensation with suitable catalysts. In general, it is desirable and in some respects critical that of the organic groups present in the fluid organopolysiloxanes, lower alkyl groups, specifically methyl groups, constitute at least 50 percent, preferably from about 70 to 100 percent, of the total number of organic groups attached to silicon by carbon-silicon linkages. For this purpose, I have found that in making the fluids, cyclic polymers of dimethylsiloxane are advantageously used for the purpose. Among such cyclic polymers may be mentioned, for instance, hexamethylcyclotrisiloxane, octamethylcyclotetrasiloxane, decamethylcyclopentasiloxane, etc. Obviously, mixtures of these cyclic organopolysiloxanes may be employed so long as the number of silicon-bonded methyl groups constitutes a major proportion of the total number of organic groups. Thus, one may employ, for instance, a mixture of octamethylcyclotetrasiloxane and a cyclic polymer of ethyl methylsiloxane having the formula $$[(CH_3)(C_2H_5)SiO]_4$$

mixtures of cyclic polymers of dimethylsiloxane with cyclic polymers of methyl vinyl siloxane, etc. When employing cyclic polymers of dimethylsiloxane with other cyclic polymers in which the organic groups of the latter cyclic polymers are short such as silicon-bonded ethyl and vinyl groups, the molar ratio of the latter two aliphatic hydrocarbons may be higher than when using longer chain aliphatic groups (e. g., from 3 to 6 carbon atoms in the chain) with the cyclic methyl polysiloxanes.

One of the unexpected features residing in my invention is the ability to obtain pressure-sensitive adhesives of outstanding tack and cohesive strength by employing a combination of a cyclic methyl polysiloxane and a cyclic phenyl siloxane, as, for instance, a mixture of octamethylcyclotetrasiloxane and octaphenylcyclotetrasiloxane having the formula $$[(C_6H_5)_2SiO]_4$$

Alternatively, instead of employing the cyclic phenyl siloxane with the cyclic methyl siloxane, one may use with the cyclic methylpolysiloxane a cyclic methyl phenyl siloxane of the formula $$[(CH_3)(C_6H_5)SiO]_m$$

where $m$ is an integer equal to at least 3, for example, from about 3 to 6, taking into account that in the latter methyl phenyl siloxane there are present methyl groups which will permit smaller amounts of the cyclic methyl siloxane to be used to obtain the desired ratio of methyl groups to phenyl groups in the prepared organopolysiloxane fluid.

The presence of phenyl groups in the fluid unpredictably imparts to the final pressure-sensitive adhesive a marked improvement in adhesion and tackiness over and above that advantageously realized by employing a high viscosity fluid which contains only silicon-bonded methyl groups in the preparation of the adhesive. The number of silicon-bonded phenyl groups present in the high viscosity fluid containing terminal silicon-bonded hydroxyl groups (which, for brevity, will hereinafter be referred to as "fluid") should be maintained within such a range that for each phenyl group attached directly to silicon by a carbon-silicon linkage, there are present from 10 to 100 silicon-bonded methyl groups. A preferred range is, for instance, from about 12 to 25 methyl groups per phenyl group. It will, of course, be apparent to those skilled in the art that instead of using the cyclic methyl polysiloxane alone or a mixture of the latter with another copolymerizable cyclic organopolysiloxane, many examples of which have been given above, additional mixtures, for instance, a cyclic methyl polysiloxane, a cyclic ethyl polysiloxane, and a cyclic phenyl polysiloxane may be employed without departing from the scope of the invention.

In preparing the siloxane fluid from the starting cyclic organopolysiloxane, the latter (which includes mixtures of cyclic organopolysiloxanes) is advantageously heated at temperatures of about 125 to 150° C. with small amounts of a siloxane rearrangement catalyst (about 0.001 to 0.1 percent, by weight, based on the weight of the cyclic organopolysiloxane) such as potassium hydroxide, cesium hydroxide, tetramethyl ammonium hydroxide, tetrabutyl phosphonium hydroxide, etc. The temperature and time at which this heating will take place will vary depending upon such factors as the type of organopolysiloxane employed, the siloxane rearrangement catalyst used, the concentration of the catalyst, the desired viscosity, etc. Certain siloxane rearrangement catalysts effect the desired polymerization of the organopolysiloxane more rapidly and at lower temperatures than others. In general, the polymerization is carried out for a time sufficient to obtain a high molecular weight product preferably having a viscosity within the range of about 75,000 to 125,000 centipoises.

After the above polymerized product is obtained, the product is treated in order to obtain terminal silicon-bonded hydroxy groups on the molecules of the organopolysiloxane for co-reaction with the hydroxyl groups of the resin. This can be readily accomplished by blowing steam across the surface of the polymer or through the polymer for a sufficient time to give the desired silanol content. The use of steam in this fashion will cause a decrease in the viscosity of the polymer while at the same time will increase the silanol content of the organopolysiloxane. By means of this action, a maximum level of silanol will be obtained, i. e., each linear polysiloxane molecule will have a terminal silicon-bonded hydroxy group. However, such a product, although it can be used in this form for co-reaction with the resin, can more readily be condensed with the resin if the molecular weight and thus the viscosity are at a higher level. For this purpose, the high-silanol-containing organopolysiloxane, which still contains the siloxane rearrangement catalyst (or to which additional catalyst may be added) is again heated at about 125° to 250° C. or above, to obtain a higher viscosity material, for instance, one having a viscosity of about 200,000 to 3,000,000 centipoises. This latter heating step is not critical and will be readily apparent to those skilled in the art as being determined by the stretch and elongation desired in the pressure-sensitive adhesive. Once the organopolysiloxane has reached the desired viscosity range recited above, it should be treated in order to inactivate the siloxane rearranging catalyst by suitable means. When employing alkali-metal hydroxides, such as potassium hydroxide, etc., this may readily be accomplished by incorporating an equivalent amount of, for instance, triphenyl phosphate as is more particularly disclosed and claimed in the pending application of Robert G. Linville Serial No. 363,940, filed June 24, 1953 (now U. S. Patent 2,739,952 issued March 27, 1956), and assigned to the same assignee as the present invention. By inactivating or neutralizing the siloxane rearrangement catalyst, more adequate control of the adhesive manufacturing step can be maintained while at the same time avoiding undesirable degradation of the fluid when it is later combined with the resin and heated to obtain the final pressure-sensitive adhesive.

The actual preparation of the organopolysiloxane pressure-sensitive adhesive is simple. Generally, it merely requires suitably mixing together the resin and the fluid and heating the mixture to effect interaction between the ingredients. To accomplish this, the resin is heated, for instance, at a temperature of about 100 to 150° C. so as to remove solvent present in the resin solution. The fluid may be added directly to the resin solution or, alternatively, part of the solvent may be removed and the organopolysiloxane fluid then added and the mixture of ingredients further heated at temperatures ranging from about 100 to 150° C. for times of the order of one-half to six hours until a product of optimum tack and cohesive strength in the final product is realized.

This is readily determined by removing samples periodically from the inter-reacted mixture to establish whether a suitable level of tackiness and cohesive strength has been attained. Instead of adding the fluid to the resin before all the solvent has been removed from the resin, one may also first remove all the solvent from the resin but extreme caution should be exercised to insure that the resin is not heated too long at the elevated temperature to cause gelation of the latter before the fluid has had a chance to interact. For this purpose and for optimum ease in handling, it is usually desirable to add the organopolysiloxane fluid to the resin before all the solvent has been removed. After a material of suitable tackiness and cohesive strength has been obtained, the interacted product is preferably dissolved in a solvent such as toluene at a convenient solids content, for example, from about 40 to 70 percent solids, which can then be advantageously employed for application to tapes, cloth, etc., by various means, for instance, brushing, spraying, knife coating, etc.

The proportion of resin to fluid employed in making the pressure-sensitive adhesive is critical and is advantageously within the range of from about 0.5 to 6 parts of the fluid per part resin solids, on a weight basis. Extremely good results are obtained when, on a weight basis, from 1 to 3 parts fluid per part resin are employed in the step described above for affecting interaction between the resin and the fluid.

Various pressure-sensitive tapes, sheets, etc., may be obtained by applying the solution of the pressure-sensitive adhesive to various backing, such as paper, cloth, glass cloth, silicone rubber, silicone-resin-coated glass cloth, polyethylene, polyethylene terephthalate sheet or tapes, polytetrafluoroethylene tapes, polychlorotrifluoroethylene tapes, etc. Generally, coatings of the order of about 0.3 to 5 mils or more thick may be employed for the purpose. In order to prevent adhesion of the pressure-sensitive adhesive to its own backing if it should be rolled up into cylinders or tapes, sheets, etc., a suitable anti-blocking or release coating or sheet may be interspersed between the surface of the pressure-sensitive adhesive and the adjacent uncoated surface of the backing for the pressure-sensitive adhesive. In this respect, one should employ materials which exhibit less adhesion to the organopolysiloxane pressure-sensitive adhesive than does the backing to which the organopolysiloxane pressure-sensitive adhesive is permanently affixed.

In order that those skilled in the art may better understand how the present invention may be practiced, the following examples are given by way of illustration and not by way of limitation. All parts are by weight.

The procedure for preparing the resins and fluids described below were essentially the same. In making the resin, the ethyl orthosilicate, trimethylchlorosilane, and toluene were charged to a reactor, and the water was added at such a rate that the temperature during the addition of the water (employing stirring throughout the period) was maintained at about 75 to 80° C., autogenous temperature, varying with proportions of water and reactants. The acid aqueous layer was then drained off and the residual organopolysiloxane layer was treated with a sufficient amount of sodium bicarbonate to neutralize essentially all the hydrochloric acid present, and thereafter the mixture was filtered.

In the following examples, the preparation of the organopolysiloxane fluids was carried out as follows. 100 parts of the cyclic organopolysiloxane (or mixture of organopolysiloxanes) was heated to about 140° C. and 0.01 part potassium hydroxide added and the heating at 140° C. continued until the viscosity of the reaction mixture reached about 100,000 centipoises. Steam was blown across the top of the polymer until the viscosity of the polymer was reduced to about 25,000–50,000 centipoises. This treatment introduced the plurality of silicon-bonded hydroxy groups required in the fluid. At this point the steam passage was discontinued and while blanketing the surface of the polymer with nitrogen, the mixture was heated again at about 140° C. until the viscosity reached about 500,000 to 1,500,000 centipoises. At this point about 0.1 part triphenyl phosphate was intimately dispersed in the reaction product and the latter then heated an additional 30 minutes to effect neutralization and render the potassium hydroxide inert.

In the preparation of the organopolysiloxane pressure-sensitive adhesive, the resin solution was placed in a doughmixer and heated to a temperature of about 100 to 125° C. sufficient to begin volatilization of the toluene. When almost all the toluene was removed (as evidenced by diminution in the volatile products), the organopolysiloxane fluid was added and the mixture of ingredients continued to be heated in a doughmixer at a temperature of about 125° C. for a time until the desired tack and cohesive strength had been developed. This generally required heating for about 2 to 3 hours at this temperature. Thereafter, xylene was added to the reaction product to bring the latter to the proper consistency for application to various backings to make tapes and similar materials. The organopolysiloxane solids content of the solution was advantageously of the order of about 55 to 65% solids.

EXAMPLE 1

A pressure-sensitive adhesive was obtained in accordance with the above directions employing the following ingredients for making the resin and the fluid. The following table shows the ingredients used in making the resin and the ingredients used in making the organopolysiloxane fluid, together with the viscosity of the organopolysiloxane fluid obtained employing as the starting ingredient octamethylcyclotetrasiloxane.

*Table I*

|  | Sample Numbers | | |
|---|---|---|---|
|  | 1 | 2 | 3 |
| Resin: | | | |
| $(CH_3)_3SiCl$ _____parts__ | 108 | 108 | 108 |
| Ethyl orthosilicate _____do____ | 374 | 374 | 374 |
| Toluene _____do____ | 250 | 250 | 160 |
| Water _____do____ | 144 | 144 | 144 |
| Resin solution weight _____do____ | 310 | 314 | 215 |
| Weight of resin (in solution) used to make adhesive _____parts__ | 71 | 75 | 71 |
| Fluid: | | | |
| Centipoises of Fluid _____ | 900,000 | 236,000 | 236,000 |
| Amount of fluid used to make adhesive _____parts__ | 224 | 168 | 56 |

In each instance interaction of the resin with the fluid employing the technique described above yielded a pressure-sensitive adhesive which had extremely good tack and cohesive strength and could be separated from itself only by exerting a large force. It was also found that each of the adhesives prepared above adhered markedly to materials to which the usual pressure-sensitive adhesives either adhere only with difficulty or do not adhere at all, as for instance, glass, polytetrafluoroethylene, polyethylene, etc.

EXAMPLE 2

In this example, pressure-sensitive adhesives similar to those described above and in Example 1 were prepared but employing in this example for the preparation of the organopolysiloxane fluid a mixture of ingredients composed of 100 parts octamethylcyclotetrasiloxane and 15 parts octaphenylcyclotetrasiloxane in the designated proportion. The following Table II shows the ratio of ingredients employed together with the properties of the resin and of the fluid.

Table II

| | Sample Numbers | | | |
|---|---|---|---|---|
| | 4 | 5 | 6 | 7 |
| Resin: | | | | |
| (CH₃)₃SiCl_____parts__ | 108 | 108 | 108 | 108 |
| Ethyl orthosilicate__do____ | 250 | 374 | 374 | 374 |
| Toluene_____do____ | 313 | 250 | 250 | 250 |
| Water_____do____ | 313 | 144 | 432 | 144 |
| Resin solution weight parts__ | 393 | 314 | 348 | 314 |
| Weight of resin (in solution) used to make adhesive_____parts__ | 93 | 110 | 82 | 75 |
| Fluid: | | | | |
| Centipoises of Fluid_____ | 720,000 | 720,000 | 720,000 | 2,800,000 |
| Amount of fluid used to make adhesive____parts__ | 224 | 225 | 224 | 224 |

Again, the pressure-sensitive adhesives prepared by combining the resin and the fluids in each instance above had extremely good tack and cohesive strength and were readily used for pressure-sensitive adhesive purposes sticking to difficultly adherent materials such as the above-mentioned glass, polytetrafluoroethylene, etc.

It should be noted that the foregoing two examples illustrate variations in the proportions of the trialkyl hydrolyzable silane and the alkyl silicate, in the amount of solvent used in making the resin, in the amount of water employed for hydrolysis purposes, in the viscosity of the fluids (which was determined after cooling the organopolysiloxane treated with the triphenyl phosphate to render the potassium hydroxide inert). In addition, Example 2 shows variations with respect to the same ingredients in the resin but also employing a combination of a cyclic methyl polysiloxane and a cyclic phenyl polysiloxane varying the viscosity of the organopolysiloxane fluid within a range of from about 720,000 to 2,800,000 centipoises.

In order to test the tack and cohesive strength of the pressure-sensitive adhesives prepared in the foregoing examples, and in order to compare the properties of a methyl polysiloxane pressure-sensitive adhesive with a methyl phenyl polysiloxane pressure-sensitive adhesive, the following tests were carried out. The pressure-sensitive adhesive solutions obtained in Sample No. 1 of Example 1 and Sample No. 5 of Example 2 were applied by knife-coating to one inch wide kraft paper to a thickness of about 2 or 3 mils of the adhesive. The tape was then heated at about 125° C. for 10 minutes to evaporate the solvent and thereafter each pressure-sensitive adhesive surface of the tape was applied to the polyethylene side of a polyethylene coated paper. Unadhered flaps of the pressure-sensitive adhesive treated paper and the polyethylene paper were then fixed in opposite clamps of Scott tester, and the bond between the polyethylene surface and the organopolysiloxane pressure-sensitive adhesive tested by attempting to pull apart the flaps of paper oppositely positioned in the clamps of the Scott tester. As a result of this testing (using three samples of each), it is found that with Sample No. 1 adhesive, an average force of 15 ounces per linear inch was required to separate the polyethylene surface from the methyl polysiloxane pressure-sensitive adhesive. With regard to the test on the methyl phenylpolysiloxane pressure-sensitive adhesive, it is found that an average of about 35 ounces per linear inch were required to effect separation of the polyethylene coated surface and the methyl phenylpolysiloxane adhesive surface.

In order to further test the high and low temperature characteristics of the pressure-sensitive adhesives herein described, glass cloth was coated with the methyl phenyl polysiloxane pressure-sensitive adhesive described in Sample No. 5 in Example 2 to a thickness of about 4 mils. This coated glass cloth was then placed in a 250° C. oven for 17 hours. Examination after this period of heating did not disclose any apparent change in the outstanding adhesive characteristics of the pressure-sensitive adhesive. An additional sample of this glass cloth with the adhesive was then applied to the polyethylene surface of a polyethylene coated paper. This latter sample, together with samples of surgical tapes and Scotch tape, also adhered to the same polyethylene-coated paper, were then placed in suitable receptacles and the temperature of the samples lowered to about −70° C. Examination of the various samples revealed that the organopolysiloxane pressure-sensitive adhesive showed as good, or better, adhesive characteristics than it exhibited at room temperature and apparently was just as flexible at this low temperature as at room temperature. In contrast to this, the other samples of surgical tapes and Scotch tape had become brittle and had lost essentially all their adhesive characteristics so that they could be readily separated from the polyethylene surface.

It will of course be apparent to those skilled in the art that other types of resins and fluids may be employed in place of those described in the foregoing examples, using different starting ingredients, many examples of which have been given above. In addition, various other proportions of ingredients within the ranges previously described used to make the resin and the fluid as well as varying amounts of resin and fluid used to make the pressure-sensitive adhesive, may be employed without departing from the scope of the invention. Other variables within the scope of the invention will be apparent to those skilled in the art.

The pressure-sensitive adhesive disclosed and claimed herein, especially when applied to various tapes, sheets, etc., may be used in applications requiring continuing adhesion at elevated temperatures of the order of about 125° to 150° C., or adhesion at extremely low temperatures of the order of below −25° to −50° C., where ordinary pressure-sensitive adhesive tapes either fail or are unsatisfactory. Pressure-sensitive adhesives which are backed with suitable sheet material or tape material can be used for insulating conductors, for sealing closures, for gaskets, etc. They can be used in the same applications where pressure-sensitive adhesives have been employed in the past, for instance, in masking operations, where it is required that the pressure-sensitive adhesive be resistant to higher or lower temperatures than those which pressure-sensitive adhesives heretofore employed have been capable of withstanding satisfactorily.

What I claim as new and desire to secure by Letters Patent of the United States is:

1. The siloxane product of intercondensation at a temperature of from about 100° to 150° C. of a mixture of ingredients composed essentially, by weight, of (1) one part of a cohydrolysis product of a mixture of ingredients consisting essentially of (a) a trialkyl hydrolyzable silane wherein the fourth valence of the silicon atom is attached directly to a hydrolyzable group and (b) an alkyl silicate, the alkyl groups of the silane and silicate containing at most four carbon atoms and said cohydrolysis product containing a plurality of silicon-bonded hydroxyl groups, there being employed a molar ratio of from 1 to 2 mols of the alkyl silicate per mol of trialkyl hydrolyzable silane, and (2) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (1) and (2).

2. A pressure-sensitive adhesive having good tack and cohesive strength comprising the siloxane product of intercondensation at a temperature of from about 100° to about 150° C. of a mixture of ingredients composed essentially, by weight, of (1) one part of a cohydrolysis product of a mixture of ingredients consisting essentially of (a) trimethylchlorosilane and (b) a monomeric alkyl silicate, the alkyl group of the silicate having at most four carbon atoms and said cohydrolysis product containing a plurality of silicon-bonded hydroxyl groups, there being employed a molar ratio of from 1 to 2 mols of the alkyl silicate per mol of the trimethylchlorosilane, and (2) from 0.5 to 6 parts of a linear high viscosity organopolysiloxane fluid of above 200,000 centipoises viscosity containing terminal silicon-bonded hydroxyl groups, the organic groups of the organopolysiloxane being attached to silicon by carbon-silicon linkages and being selected from the class consisting of monovalent hydrocarbon radicals and halogenated aryl radicals, there being present an average of about two organic groups per silicon atom, said intercondensation proceeding through the medium of the silicon-bonded hydroxyl groups of (1) and (2).

3. A pressure-sensitive adhesive having good tack and cohesive strength comprising the siloxane product of intercondensation at a temperature of from about 100° to about 150° C. of a mixture of ingredients composed essentially, by weight, of (1) one part of a cohydrolysis product of a mixture of ingredients consisting essentially of (a) trimethylchlorosilane and (b) a polymeric alkyl silicate, the alkyl groups of the silicate having at most four carbon atoms and said cohydrolysis product containing a plurality of silicon-bonded hydroxyl groups, the mixture of ingredients being present in a molar ratio of from 1 to 2 mols of the alkyl silicate per mol of the trimethylchlorosilane, and (2) from 0.5 to 6 parts of a linear high viscosity organopolysiloxane fluid of above 200,000 centipoises viscosity containing terminal silicon-bonded hydroxyl groups, the organic groups of the said organopolysiloxane being attached to silicon by carbon-silicon linkages and being selected from the class consisting of monovalent hydrocarbon radicals and halogenated aryl radicals, there being present an average of about two organic groups per silicon atom, said intercondensation proceeding through the medium of the silicon-bonded hydroxyl groups of (1) and (2).

4. A pressure-sensitive adhesive comprising the siloxane product of intercondensation at a temperature of from about 100° to about 150° C. of a mixture of ingredients composed essentially, by weight, of (1) one part of a cohydrolysis product of a mixture of ingredients consisting essentially of trimethylchlorosilane and ethyl orthosilicate, said cohydrolysis product containing a plurality of silicon-bonded hydroxyl groups, there being employed a molar ratio of from 1 to 2 mols of the ethyl orthosilicate per mol trimethylchlorosilane, and (2) from 0.5 to 6 parts of a linear high viscosity methylpolysiloxane fluid of above 200,000 centipoises viscosity and containing terminal silicon-bonded hydroxyl groups and having a ratio of about two methyl groups per silicon atom, said intercondensation proceeding through the medium of the silicon-bonded hydroxyl groups of (1) and (2).

5. A pressure-sensitive adhesive comprising the siloxane product of intercondensation at a temperature of from about 100° to about 150° C. of a mixture of ingredients composed essentially, by weight, of (1) one part of a cohydrolysis product of a mixture of ingredients consisting essentially of trimethylchlorosilane and polyethyl silicate, said cohydrolysis product containing a plurality of silicon-bonded hydroxyl groups, there being employed a molar ratio of from 1 to 2 mols of the polyethyl silicate per mol of the trimethylchlorosilane, and (2) from 0.5 to 6 parts of a linear high viscosity methylpolysiloxane fluid of above 200,000 centipoises viscosity and containing terminal silicon-bonded hydroxyl groups and having a ratio of about two methyl groups per silicon atom, said intercondensation proceeding through the medium of the silicon-bonded hydroxyl groups of (1) and (2).

6. A pressure-sensitive adhesive comprising the siloxane product of intercondensation at a temperature of from about 100° to about 150° C. of a mixture of ingredients composed essentially, by weight, of (1) one part of a cohydrolysis product of a mixture of ingredients consisting essentially of a trimethylchlorosilane and ethyl orthosilicate, said cohydrolysis product containing a plurality of silicon-bonded hydroxyl groups, there being employed a molar ratio of from 1 to 2 mols of the ethyl orthosilicate per mol trimethylchlorosilane, and (2) from 0.5 to 6 parts of a linear high viscosity methyl phenylpolysiloxane fluid of above 200,000 centipoises viscosity and containing terminal silicon-bonded hydroxyl groups and having a ratio of approximately two total methyl and phenyl groups per silicon atom, said intercondensation proceeding through the medium of the silcon-bonded hydroxyl groups of (1) and (2).

7. A pressure-sensitive adhesive tape composed of (1) a coherent unitary backing and (2) a pressure-sensitive adhesive applied to a surface of said backing comprising the siloxane product of intercondensation at a temperature of from about 100° to about 150° C. of a mixture of ingredients composed essentially, by weight, of (a) one part of a cohydrolysis product of a mixture of ingredients consisting essentially of a trialkyl hydrolyzable silane wherein the fourth valence of the silicon atom is attached directly to a hydrolyzable group, and an alkyl silicate, the alkyl groups of the silane and of the silicate having at most four carbon atoms and said cohydrolysis product containing a plurality of silicon-bonded hydroxyl groups, there being employed a molar ratio from one to two mols of the alkyl silicate per mol of the trialkyl hydrolyzable silane, and (b) from 0.5 to 6 parts of a linear high viscosity organopolysiloxane fluid of above 200,000 centipoises viscosity and containing terminal silicon-bonded hydroxyl groups, the organic groups of the organopolysiloxane being attached to silicon by carbon-silicon linkages and being selected from the class consisting of monovalent hydrocarbon radicals and halogenated aryl radicals, there being present an average of about two organic groups per silicon atom, said intercondensation proceeding through the medium of the silicon-bonded hydroxyl groups of (a) and (b).

8. A pressure-sensitive adhesive tape composed of (1) a coherent unitary backing and (2) a pressure-sensitive adhesive applied to a surface of said backing comprising the siloxane product of intercondensation at a temperature from about 100° to about 150° C. of a mixture of ingredients composed essentially, by weight, of (a) one part of a cohydrolysis product of a mixture of ingredients consisting essentially of trimethylchlorosilane and ethyl orthosilicate, said cohydrolysis product containing a plurality of silicon-bonded hydroxyl groups, there being present a molar ratio of from 1 to 2 mols of the ethyl orthosilicate per mol trimethylchlorosilane, and (b) 0.5 to 6 parts of a linear high viscosity methylpolysiloxane fluid of above 200,000 centipoises viscosity and containing terminal silicon-bonded hydroxyl groups and having an average of about two methyl groups per silicon atom, said intercondensation proceeding through the medium of the silicon-bonded hydroxyl groups of (a) and (b).

9. A pressure-sensitive tape composed of (1) a coherent unitary backing and (2) a pressure-sensitive adhesive applied to a surface of said backing comprising the siloxane product of intercondensation at a temperature from about 100° to about 150° C. of a mixture of ingredients composed essentially, by weight, of (a) one part of a cohydrolysis product of a mixture of ingredients consisting essentially of trimethylchlorosilane and ethyl orthosilicate, said cohydrolysis product containing a plurality of silicon-bonded hydroxyl groups, there being employed a molar ratio of from 1 to 2 mols ethyl orthosilicate per mol trimethylchlorosilane, and (b) from 0.5 to 6 parts of a linear high viscosity methyl phenyl polysiloxane fluid of above 200,000 centipoises viscosity and containing terminal silicon-bonded hydroxyl groups and having an average of about two total methyl and phenyl radicals per silicon atom, said intercondensation proceeding through the medium of the silicon-bonded hydroxyl groups of (a) and (b).

10. A pressure-sensitive tape as in claim 8 in which the backing is glass cloth.

11. A pressure-sensitive tape as in claim 8 in which the backing is silicone rubber.

12. A pressure-sensitive tape as in claim 9 in which the backing is glass cloth.

13. A pressure-sensitive tape as in claim 9 in which the backing is silicone rubber.

14. A pressure-sensitive tape as in claim 9 in which the backing is polytetrafluoroethylene.

15. The process for making a pressure-sensitive adhesive which comprises forming a mixture of ingredients composed essentially, by weight, of (1) one part of a cohydrolysis product of a mixture of ingredients consisting essentially of (a) a trialkyl hydrolyzable silane in which the fourth valence of the silicon atom is attached directly to a hydrolyzable group and (b) an alkyl silicate, the alkyl group of the silane and the silicate containing at most four carbon atoms, and said cohydrolysis product containing a plurality of silicon-bonded hydroxyl groups, there being employed a molar ratio of from 1 to 2 mols of the alkyl silicate per mol of the trialkyl hydrolyzable silane and (2) from 0.5 to 6 parts, by weight, of a linear high viscosity organopolysiloxane fluid of above 200,000 centipoises viscosity and containing terminal silicon-bonded hydroxyl groups, the organic groups of the organopolysiloxane being attached to silicon by carbon-silicon linkages and being selected from the class consisting of monovalent hydrocarbon radicals and halogenated aryl radicals, there being present an average of about two organic groups per silicon atom in the organopolysiloxane fluid, and thereafter heating the above mixture of ingredients at a temperature of from about 100° to about 150° C. to effect a siloxane intercondensation through the medium of the silicon-bonded hydroxyl groups of (1) and (2).

References Cited in the file of this patent

UNITED STATES PATENTS

| | | |
|---|---|---|
| 2,258,218 | Rochow | Oct. 7, 1941 |
| 2,389,477 | Wright et al. | Nov. 20, 1945 |
| 2,442,196 | Coggeshall | May 25, 1948 |
| 2,458,944 | Hyde | Jan. 11, 1949 |
| 2,607,792 | Warrick | Aug. 19, 1952 |
| 2,672,455 | Currie | Mar. 16, 1954 |
| 2,676,182 | Daudt et al. | Apr. 20, 1954 |
| 2,814,601 | Currie et al. | Nov. 26, 1957 |

OTHER REFERENCES

Rochow: Chemistry of the Silicones, 2nd ed., 1951, pages 82, 94–97 and 104–107. Published by John Wiley & Sons, N. Y.

Pfeifer et al.: India Rubber World, vol. 129, No. 4, January 1954, pages 481–484 and 488.